March 6, 1962

JIRO MUKAI 3,023,671

PHOTOGRAPHIC OBJECTIVE

Filed July 31, 1957

INVENTOR.
Jiro Mukai
BY
ATTORNEY

United States Patent Office 3,023,671
Patented Mar. 6, 1962

3,023,671
PHOTOGRAPHIC OBJECTIVE
Jiro Mukai, Kohokuku, Yokohama City, Japan, assignor to Canon Camera Company, Inc., Tokyo, Japan, a corporation of Japan
Filed July 31, 1957, Ser. No. 675,353
Claims priority, application Japan Oct. 9, 1956
2 Claims. (Cl. 88—57)

The present invention relates particularly to Gauss type objectives for photography and comprising four components.

It is an object of the present invention to provide a photographic objective highly corrected for chromatic, spherical, astigmatic and distortional aberrations.

Another important object is to provide such an objective of improved and increased correction for image curvature, as also coma, to the highest degree by applying a new and novel system throughout.

A clearer concept of the scope and purpose of the invention will be obtained from the following description of two illustrative embodiments thereof taken in connection with the attached drawing, in which.

Figure 1:
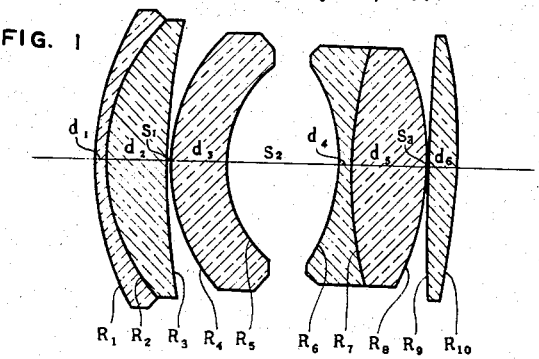
FIG. 1 shows a first illustrative embodiment of the photographic objective of the invention.
Figure 2:
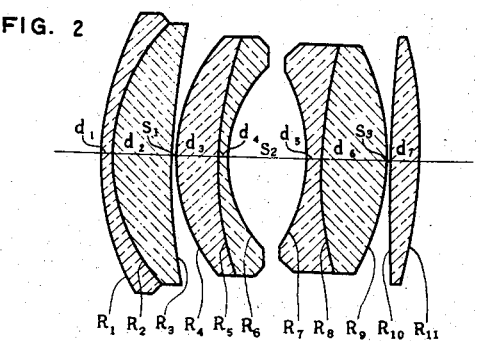
FIG. 2 shows a second illustrative embodiment thereof utilizing seven lenses.

To correct chromatic, spherical, astigmatic and distortional aberrations, and particularly to correct image curvature and coma so that such aberrations are a minimum, the present invention provides the following structural characteristics for the photographic objective:

The whole optical system comprises four axially aligned and air spaced components consisting either of six lens elements as shown in FIG. 1 or a modified form of seven lens elements as shown in FIG. 2. The first component is a positive one consisting of a front negative meniscus element and a positive element cemented to the first meniscus with its strongly curved, convergent cemented surface towards the object. The second component is a single element negative meniscus lens with its convex surface towards the object. The third component is a negative meniscus lens consisting of a front negative element and a rear positive element cemented to the front negative element with its concave outer surface towards the object and its curved cemented surface of a converging power towards the object. The fourth component is a single biconvex positive lens. On the basis of the above mentioned structure, the following conditions must be satisfied:

(1) In the first component, the refractive index for the spectrum $d$-line of the positive element is greater than that of the front negative meniscus element, such difference lying between 0.02 and 0.15;

(2) The radius of curvature of the cemented surface of the first component is greater than 0.2F and smaller than 0.5F, where F represents the effective focal length of the whole optical system;

(3) The axial thickness of the air space between the second and third components is greater than 0.12F and smaller than 0.35F;

(4) The refractive index of the positive lens element of the third component is greater than that of the negative lens element thereof, the difference lying between 0.05 to 0.15; and (5) The absolute value of the radius of curvature of the concave surface of the third component is greater than 0.2F and smaller than 0.5F.

The following example represents an embodiment of a photographic objective according to the present invention, in which the effective focal length of the whole system is denoted by F, and the aperture ratio by $f$. The radii R, thicknesses $d$, spaces $s$, refractive indices for the $d$-line of the spectrum N, and the Abbe number $v$, are numbered, respectively, by subscripts in order from front to rear:

EXAMPLE 1

*A Six Lens Objective*

[$F=1$    $f$:1.8    $2\alpha=46°$]

| | | | |
|---|---|---|---|
| $R_1 = 0.578$ | $d_1 = 0.015$ | $N_1 = 1.63980$ | $v_1 = 34.6$ |
| $R_2 = 0.369$ | $d_2 = 0.121$ | $N_2 = 1.69100$ | $v_2 = 54.8$ |
| $R_3 = 1.326$ | $s_1 = 0.003$ | | |
| $R_4 = 0.338$ | $d_3 = 0.098$ | $N_3 = 1.62004$ | $v_3 = 36.3$ |
| $R_5 = 0.240$ | $s_2 = 0.216$ | | |
| $R_6 = -0.329$ | $d_4 = 0.019$ | $N_4 = 1.5927$ | $v_4 = 35.4$ |
| $R_7 = 0.767$ | $d_5 = 0.144$ | $N_5 = 1.6935$ | $v_5 = 53.5$ |
| $R_8 = -0.480$ | $s_3 = 0.003$ | | |
| $R_9 = 4.620$ | $d_6 = 0.053$ | $N_6 = 1.7200$ | $v_6 = 50.31$ |
| $R_{10} = -1.018$ | | | |

Figure 3:
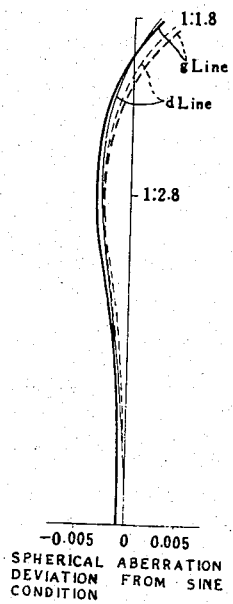
FIG. 3 illustrates the graphs representing the correction for spherical aberration and the deviation in the sine condition of the photographic objective shown in FIG. 1.
Figure 4:
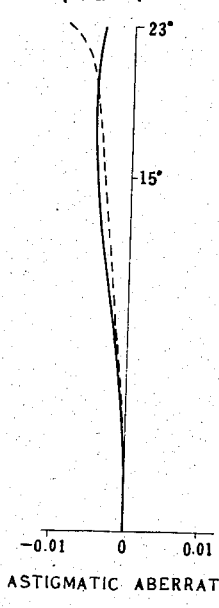
FIG. 4 illustrates the graphs representing the correction for astigmatism and image curvature of the objective.
Figure 5:
FIG. 5 illustrates the graph showing the correction for distortion of the objective.

The spherical aberration, deviation from the sine condition, astigmatism, image curvature and distortion of the objective of Example 1 above are shown in FIGS. 3, 4 and 5, respectively.

As will readily be noted from the above table and the graphs of FIGS. 3, 4 and 5, an advantage of the photographic objective according to the present invention is that in the above mentioned structure all aberrations are well corrected while maintaining a good balance. It is another advantage of the objective of the invention that correction of image curvature is remarkably improved by the particular arrangement given above. Still a further advantage is that coma is effectively corrected without impeding observance of the four conditions above or impairing other aberrations.

It is common in the art to include a cemented surface to correct certain aberrations of higher degree. In the modified embodiment of the invention shown in FIG. 2, the second component is a cemented meniscus component, and the details of the objective are given below:

EXAMPLE 2

A Seven Lens Objective $[F=1 \quad f:1.8 \quad 2\alpha=46°]$

| | | | |
|---|---|---|---|
| $R_1 = 0.539$ | $d_1=0.025$ | $N_1=1.6200$ | $V_1=36.3$ |
| $R_2 = 0.365$ | $d_2=0.161$ | $N_2=1.67790$ | $V_2=55.52$ |
| $R_3 = 1.324$ | $s_1=0.003$ | | |
| $R_4 = 0.340$ | $d_3=0.078$ | $N_3=1.60323$ | $V_3=42.5$ |
| $R_5 = 0.676$ | $d_4=0.021$ | $N_4=1.62004$ | $V_4=36.3$ |
| $R_6 = 0.243$ | $s_2=0.162$ | | |
| $R_7 = -0.321$ | $d_5=0.022$ | $N_5=1.6364$ | $V_5=35.4$ |
| $R_8 = 0.770$ | $d_6=0.125$ | $N_6=1.6935$ | $V_6=53.5$ |
| $R_9 = -0.468$ | $s_3=0.003$ | | |
| $R_{10}=3.573$ | $d_7=0.053$ | $N_7=1.7440$ | $V_7=44.9$ |
| $R_{11}=-1.054$ | | | |

What is claimed is:

1. The photographic objective consisting of four components axially spaced in the following order: a positive meniscus component convex to the object, a negative meniscus component convex to the object, a negative meniscus component concave to the object, and a biconvex positive component, the first component comprising a negative meniscus element and a positive meniscus element cemented to the negative element, the refractive index of the positive element being higher by an amount of from 0.02 to 0.15 than that of the negative element, and the radius of curvature of the cemented surface of the first component lies between 0.2F and 0.5F; the axial thickness of the air space between the second and third components being between 0.12F and 0.35F, the refractive index of the positive lens element of the third component being higher than that of the negative lens element thereof by a value between 0.05 and 0.15, and the absolute value of the radius of curvature of the concave surface of the third component being between 0.2F and 0.5F of which objective the numerical data is as follows:

$[F=1 \quad f:1.8 \quad 2\alpha=46°]$

| | | | |
|---|---|---|---|
| $R_1 = 0.578$ | $d_1=0.015$ | $N_1=1.63980$ | $v_1=34.6$ |
| $R_2 = 0.369$ | $d_2=0.121$ | $N_2=1.69100$ | $v_2=54.8$ |
| $R_3 = 1.326$ | $s_1=0.003$ | | |
| $R_4 = 0.338$ | $d_3=0.098$ | $N_3=1.62004$ | $v_3=36.3$ |
| $R_5 = 0.240$ | $s_2=0.216$ | | |
| $R_6 = -0.329$ | $d_4=0.019$ | $N_4=1.5927$ | $v_4=35.4$ |
| $R_7 = 0.767$ | $d_5=0.144$ | $N_5=1.6935$ | $v_5=53.5$ |
| $R_8 = -0.480$ | $s_3=0.003$ | | |
| $R_9 = 4.620$ | $d_6=0.053$ | $N_6=1.7200$ | $v_6=50.31$ |
| $R_{10}=-1.018$ | | | | where F is the focal length of the whole objective, $f$ the aperture ratio, and R the radius, $d$ the thickness, $s$ the air space, N the refractive index for the $d$-line of the spectrum, and V the Abbe number with subscripts increasing in order from the front to the rear of the objective.

2. The photographic objective consisting of four components axially spaced in the following order: a positive meniscus component convex to the object, a negative meniscus component convex to the object, a negative meniscus component concave to the object, and a biconvex positive component, the first component comprising a negative meniscus element and a positive meniscus element cemented to the negative element, and the refractive index of the positive element being higher by an amount of from 0.02 to 0.15 than that of the negative element, and the radius of curvature of the cemented surface of the first component lies between 0.2F and 0.5F; the second component consists of a front positive meniscus element and a negative meniscus element cemented to the front positive element, the radius of curvature of the cemented surface of the second component being betwee 0.4F and 1.5F, the refractive index of the rear negative element of the second component being higher than that of the front positive element thereof by a value between zero and 0.1, the axial thickness of the air space between the second and the third components being between 0.12F and 0.35F, the refractive index of the positive lens element of the third component being higher than that of the negative lens element thereof by a value between 0.05 and 0.15, and the absolute value of the radius of curvature of the concave surface of the third component being between 0.2F and 0.5F, of which objective the numerical data is as follows:

$[F=1 \quad f:1.8 \quad 2\alpha=46°]$

| | | | |
|---|---|---|---|
| $R_1 = 0.539$ | $d_1=0.025$ | $N_1=1.6200$ | $V_1=36.3$ |
| $R_2 = 0.365$ | $d_2=0.161$ | $N_2=1.67790$ | $V_2=55.52$ |
| $R_3 = 1.324$ | $s_1=0.003$ | | |
| $R_4 = 0.340$ | $d_3=0.078$ | $N_3=1.60323$ | $V_3=42.5$ |
| $R_5 = 0.676$ | $d_4=0.021$ | $N_4=1.62004$ | $V_4=36.3$ |
| $R_6 = 0.243$ | $s_2=0.162$ | | |
| $R_7 = -0.321$ | $d_5=0.022$ | $N_5=1.6364$ | $V_5=35.4$ |
| $R_8 = 0.770$ | $d_6=0.125$ | $N_6=1.6935$ | $V_6=53.5$ |
| $R_9 = -0.468$ | $s_3=0.003$ | | |
| $R_{10}=3.573$ | $d_7=0.053$ | $N_7=1.7440$ | $V_7=44.9$ |
| $R_{11}=-1.054$ | | | | where F is the focal length of the whole objective, $f$ the aperture ratio, and R the radius, $d$ the thickness, $s$ the air space, N the refractive index for the $d$-line of the spectrum, and V the Abbe number with subscripts increasing in order from the front to the rear of the objective.

References Cited in the file of this patent

UNITED STATES PATENTS

| | | |
|---|---|---|
| 2,171,640 | Berek | Sept. 5, 1939 |
| 2,461,182 | Schade | Feb. 8, 1949 |
| 2,645,155 | Tronnier | July 14, 1953 |
| 2,646,721 | Tronnier | July 28, 1953 |
| 2,683,398 | Klemt et al. | July 13, 1954 |
| 2,724,994 | Lange | Nov. 29, 1955 |
| 2,779,239 | Ito | Jan. 29, 1957 |

FOREIGN PATENTS

| | | |
|---|---|---|
| 376,044 | Great Britain | July 7, 1932 |
| 685,572 | Germany | Dec. 20, 1939 |